US012580266B2

(12) United States Patent
Kim

(10) Patent No.: US 12,580,266 B2
(45) Date of Patent: Mar. 17, 2026

(54) BATTERY PACK FOR VEHICLE

(71) Applicants:Hyundai Motor Company, Seoul (KR); Kia Corporation, Seoul (KR)

(72) Inventor: Kyung Mo Kim, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 667 days.

(21) Appl. No.: 17/892,513

(22) Filed: Aug. 22, 2022

(65) Prior Publication Data

US 2023/0187759 A1 Jun. 15, 2023

(30) Foreign Application Priority Data

Dec. 13, 2021 (KR) ........................ 10-2021-0177901

(51) Int. Cl.
H01M 50/264 (2021.01)
H01M 10/42 (2006.01)
(Continued)

(52) U.S. Cl.
CPC ....... H01M 50/264 (2021.01); H01M 10/425 (2013.01); H01M 10/482 (2013.01);
(Continued)

(58) Field of Classification Search
CPC ............. H01M 50/264; H01M 50/519; H01M 50/569; H01M 50/507; H01M 50/51;
(Continued)

(56) References Cited

U.S. PATENT DOCUMENTS

2019/0173066 A1* 6/2019 Kim ..................... H01M 50/505
2021/0091350 A1 3/2021 Yoon et al.
(Continued)

FOREIGN PATENT DOCUMENTS

CN 112151699 A * 12/2020
CN 214254636 * 9/2021
(Continued)

OTHER PUBLICATIONS

Extended European Search Report issued Oct. 31, 2023 in corresponding European Patent Application No. 22191713.1.
(Continued)

*Primary Examiner* — Alexander Usyatinsky
(74) *Attorney, Agent, or Firm* — Fox Rothschild LLP

(57) ABSTRACT

Disclosed is a battery pack for a vehicle. The battery pack includes a battery unit with overlapped battery cells; unit busbars respectively coupled to electrodes at opposite ends of the battery cells and extended upward from the battery unit; unit busbar support bodies located at opposite ends of the battery unit and supporting the unit busbars and the battery cells; a lower tray on which overlapped battery units are loaded and supporting lower surfaces and side surfaces of the battery units; a pressing plate disposed between each of side walls of the lower tray and the battery units and configured to press the battery units in an overlapped direction of the battery units; and a top cover forcibly coupled to the overlapped battery units in a downward direction to cover upper portions of the battery units and configured to supply pressure for the pressing plate to press the battery units.

16 Claims, 14 Drawing Sheets

(51) Int. Cl.

| | |
|---|---|
| *H01M 10/48* | (2006.01) |
| *H01M 50/211* | (2021.01) |
| *H01M 50/271* | (2021.01) |
| *H01M 50/503* | (2021.01) |
| *H01M 50/507* | (2021.01) |
| *H01M 50/51* | (2021.01) |
| *H01M 50/519* | (2021.01) |
| *H01M 50/569* | (2021.01) |
| *B60L 50/64* | (2019.01) |

(52) U.S. Cl.
CPC ....... *H01M 10/486* (2013.01); *H01M 50/211* (2021.01); *H01M 50/271* (2021.01); *H01M 50/503* (2021.01); *H01M 50/507* (2021.01); *H01M 50/51* (2021.01); *H01M 50/519* (2021.01); *H01M 50/569* (2021.01); *B60L 50/64* (2019.02); *H01M 2010/4271* (2013.01); *H01M 2220/20* (2013.01)

(58) Field of Classification Search
CPC ............. H01M 50/503; H01M 50/271; H01M 10/425; H01M 10/482; H01M 10/486; H01M 2010/4271; H01M 2220/20; B60L 50/64

See application file for complete search history.

(56) References Cited

U.S. PATENT DOCUMENTS

| | | | |
|---|---|---|---|
| 2021/0184303 A1* | 6/2021 | Lee ..................... | H01M 10/647 |
| 2022/0209368 A1* | 6/2022 | Huang ............... | H01M 50/519 |

FOREIGN PATENT DOCUMENTS

| | | | | |
|---|---|---|---|---|
| CN | 214254636 U | 9/2021 | | |
| KR | 10-2021-0122412 A | 10/2021 | | |
| WO | WO-2020111665 A1 * | 6/2020 | ......... | H01M 50/264 |
| WO | 2021/129136 A1 | 7/2021 | | |
| WO | WO 2021/129136 * | 7/2021 | | |

OTHER PUBLICATIONS

Partial European Search Report issued on Jul. 7, 2023 in corresponding European Patent Application No. 22191713.1.

* cited by examiner

19

63

BATTERY PACK FOR VEHICLE

CROSS REFERENCE TO RELATED APPLICATION

The present application is based on and claims the benefit of Korean Patent Application No. 10-2021-0177901, filed Dec. 13, 2021, the entire contents of which is incorporated herein for all purposes by this reference.

TECHNICAL FIELD

Embodiments of the present disclosure relate generally to a structure of a battery pack used in an electric vehicle, etc.

DESCRIPTION OF RELATED ART

A battery pack mounted in an electric vehicle, etc. has a plurality of battery cells. In general, the plurality of battery cells are coupled to each other to form a battery module, and a plurality of battery modules are coupled to each other to form a battery pack.

The battery module imparts mechanical rigidity to pouch-type battery cells and facilitate forming the battery pack. However, an end plate, etc. included in the battery module occupies the internal space of the battery pack, and as a result, the number of the battery cells that can be accommodated in the battery pack is reduced and it is an obstacle to maximizing energy density of the battery pack.

The foregoing described as the controller and the controlling method of operating a fuel cell is intended merely to aid in the understanding of the background of embodiments of the present disclosure, and is not intended to mean that embodiments of the present disclosure fall within the purview of the related art that is already known to those skilled in the art.

SUMMARY

Accordingly, embodiments of the present disclosure have been made keeping in mind the above problem occurring in the related art, and embodiments of the present disclosure are intended to provide a battery pack for a vehicle, wherein the battery pack, which is to have pouch-type battery cells built therein, is configured such that as many battery cells as possible are built therein to maximize energy density thereof, the battery cells are relatively easily built into the battery pack, and solid durability of the battery cells built in the battery pack is secured.

In order to achieve the above objective, according to one exemplary embodiment of the present disclosure, there is provided a battery pack for a vehicle, the battery pack including: a battery unit including a plurality of battery cells overlapped with each other; unit busbars respectively coupled to electrodes at opposite ends of the battery cells constituting the battery unit, the unit busbars being extended upward from the battery unit; unit busbar support bodies located at opposite ends of the battery unit and supporting both the unit busbars and the battery cells; a lower tray on which battery units may be loaded while being overlapped with each other, the lower tray supporting lower surfaces and side surfaces of the overlapped battery units; a pressing plate disposed between each of side walls of the lower tray and the battery units, and configured to press the battery units in an overlapped direction of the battery units; and a top cover forcibly coupled to the overlapped battery units in a downward direction so as to cover upper portions of the overlapped battery units, and configured to supply pressure for the pressing plate to press the battery units.

The battery unit may be configured such that two battery cells may be overlapped with each other with a compressed pad provided between the two battery cells; and each of the unit busbars may be coupled to the electrodes of the overlapped two battery cells.

Each of the unit busbar support bodies may include a unit busbar housing and an unit busbar cover, the unit busbar housing supporting a gap between the battery cells and each of the unit busbars and the unit busbar cover being coupled to the unit busbar housing with the unit busbar located between the unit busbar housing and the unit busbar cover and covering an outer portion of the unit busbar.

Each of the unit busbar support bodies may have a restriction protrusion and a restriction groove at positions corresponding to each other so as to restrain a relative location in response to another unit busbar support body overlapped with each other.

The lower tray may include a center member at a center portion thereof and the side walls at side portions thereof; and a plurality of battery units may be arranged to be overlapped with each other between the center member and each of the side walls.

The pressing plate may have a flat surface facing the battery units and an inclined surface opposite to the flat surface, the inclined surface protruding to be gradually inclined outward in the downward direction.

The top cover may include wedge portions integrally formed on lower portions of opposite ends, the wedge portions being configured to press the inclined surface of the pressing plate while being moved downward, so that the pressing plate may press the overlapped battery units toward the center member.

Each of the side walls of the lower tray may have an inner protrusion at a lower portion thereof, the inner protrusion protruding toward the overlapped battery units; and the pressing plate may have a guide surface, the guide surface constituting a triangle together with the inclined surface and being in surface-contact with an upper surface of the inner protrusion and being configured to guide the pressing plate when the pressing plate is moved toward the battery units.

The battery pack may include: a plurality of pressure bolts configured to press each of the wedge portions of the top cover toward the inner protrusion of the lower tray, wherein the inclined surface and the guide surface of the pressing plate may respectively have a plurality of through holes, and the plurality of through holes may allow the pressing plate to be moved while the plurality of pressure bolts pass through the pressing plate.

The battery pack may include: a sensing assembly provided above the top cover, the sensing assembly being configured to electrically connect the unit busbars of the battery units loaded on the lower tray to each other, wherein the sensing assembly may be formed in a single flat plate integrated with a high current busbar connecting all the battery units loaded on the lower tray to each other in series.

The high current busbar may include: a plurality of inter-busbars arranged in rows at predetermined intervals in an overlapped direction of the battery units so as to connect the unit busbars of the battery units located adjacent to each other; and a plurality of long busbars arranged obliquely across the overlapped battery units so that the rows of the inter-busbars may be connected to each other.

The sensing assembly may include a plurality of temperature sensors measuring temperatures of the battery units.

The sensing assembly may include a plurality of center monitor unit (CMU) connectors configured to transmit a voltage of each of the battery cells constituting each of the battery units and data of the temperature sensors to a CMU.

The sensing assembly may include a FPCB integrally provided, the FPCB may be connected to the plurality of inter-busbars, the plurality of temperature sensors, and the plurality of CMU connectors so as to transmit the voltage and temperature information of each of the battery units through the CMU connectors.

The top cover may be formed with a width narrower than a length of each of the battery units so that the unit busbars of the battery unit may be exposed upward; and the high current busbar of the sensing assembly may be weld to the upper surfaces of the unit busbars of the battery units exposed through opposite sides of the top cover.

According to embodiments of the present disclosure, the battery pack to have the pouch-type battery cells built therein can have as many battery cells as possible, so that energy density of the battery pack can be maximized, and the battery cells can be relatively easily built in the battery pack and solid durability of the battery cells built in the battery pack can be secured.

As discussed, the method and apparatus suitably include use of a controller or processer.

In another embodiment, vehicles are provided that comprise an apparatus as disclosed herein.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION

Figure 1:
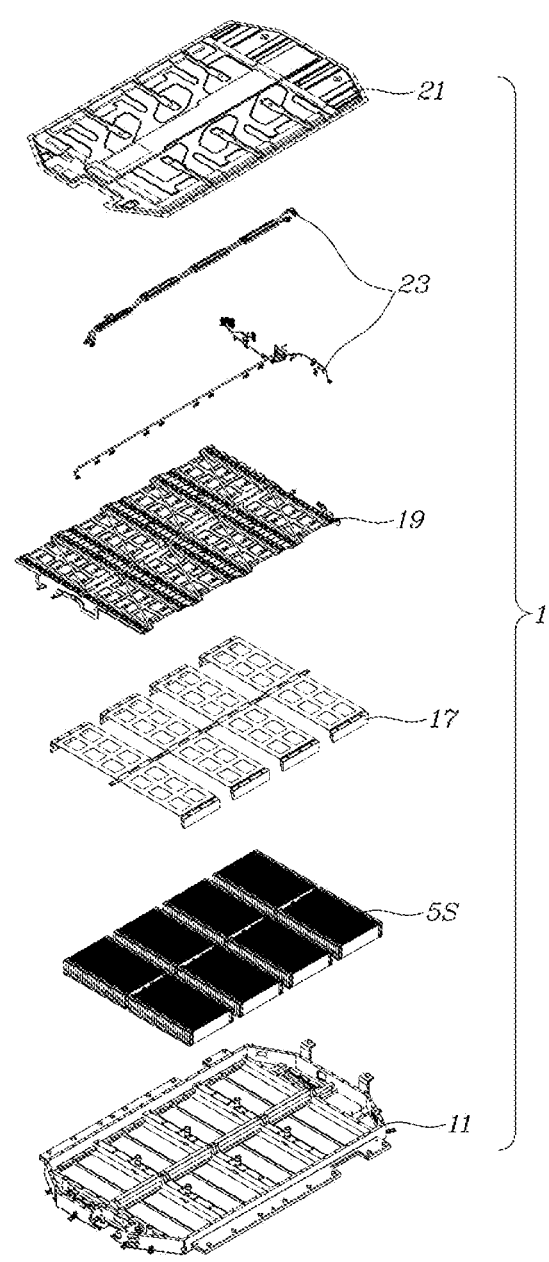
FIG. 1 is an exploded-perspective view showing a battery pack for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of embodiments of the present disclosure is intended to describe the exemplary embodiments, so it should be understood that embodiments of the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the embodiments of present disclosure are not limited to the embodiments which will be described hereinbelow with reference to the accompanying drawings, but all of modifications, equivalents, and substitutions are included in the scope and spirit of embodiments of the disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of embodiments of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit embodiments of the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which embodiments of the present disclosure belong. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

Figure 2:
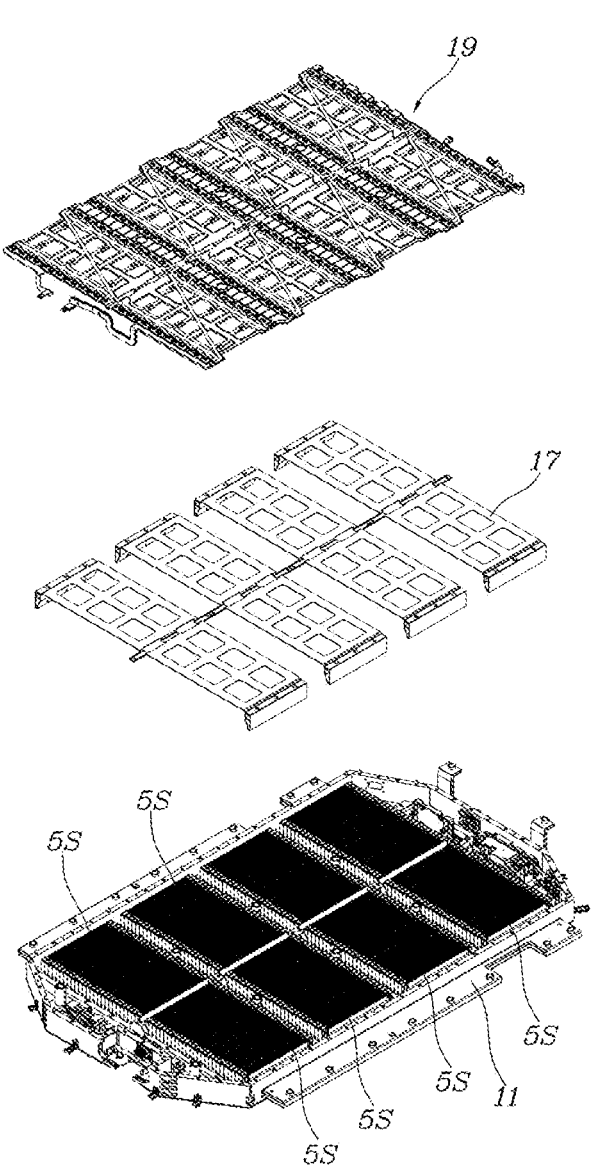
FIG. 2 is a detailed view showing a main part shown in FIG. 1.
Figure 3:
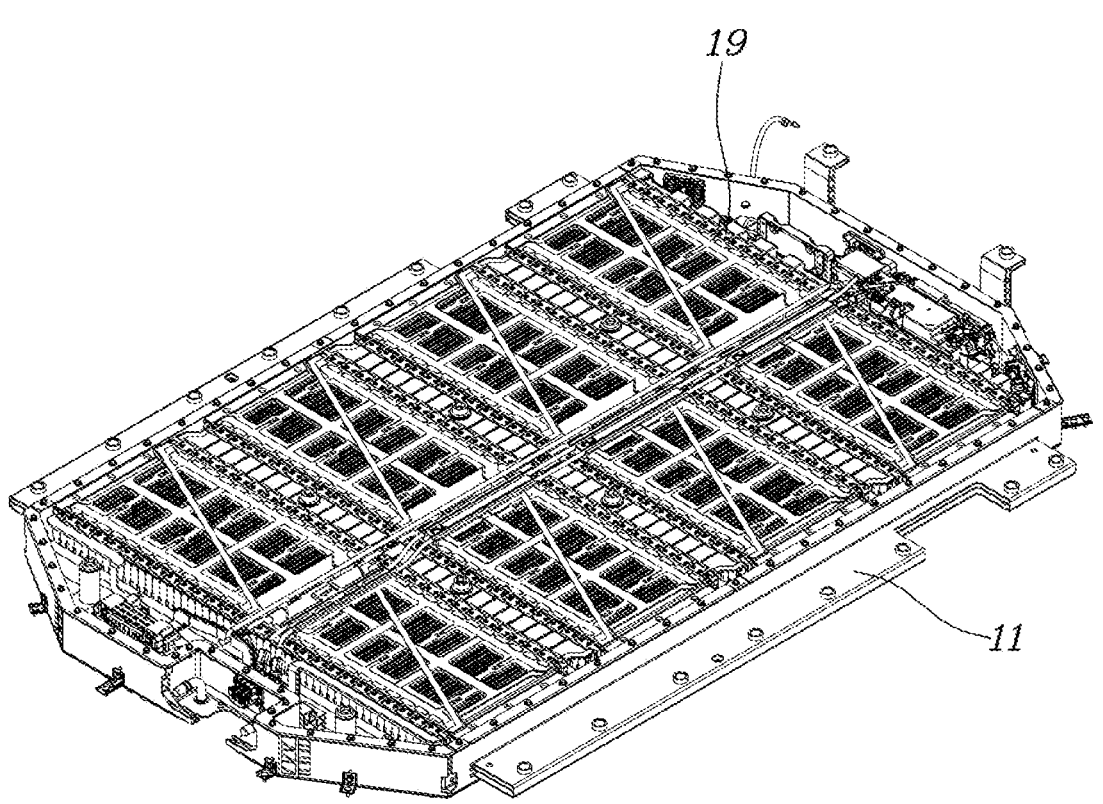
FIG. 3 is a view showing assembled parts shown in FIG. 2.

Referring to FIGS. 1 to 3, according to embodiments of the present disclosure, a battery pack 1 for a vehicle may include: a battery unit 5 comprising battery cells 3 overlapped with each other; unit busbars 7 respectively connected to electrodes at opposite ends of the battery cells 3 constituting the battery unit 5, and extended upward from the battery unit 5; unit busbar support bodies 9 located at opposite ends of the battery unit 5 and supporting the unit busbars 7 and the battery cells 3; a lower tray 11 on which battery units 5 are loaded while being overlapped with each other, the lower tray 11 supporting lower surfaces and side surfaces of the overlapped battery units 5; a pressing plate 15 disposed between each of side walls 13 of the lower tray 11 and the battery units 5, and configured to press the battery units 5 in an overlapped direction of the battery units 5; and a top cover 17 forcibly coupled to the overlapped battery units 5 in a downward direction so as to cover upper portions of the overlapped battery units 5, and configured to supply pressure for the pressing plate 15 to press the battery units 5.

Furthermore, a sensing assembly 19 may be provided above the top cover 17 to electrically connect the unit busbars 7 of the battery units 5 loaded on the lower tray 11 to each other. An upper casing 21 may be coupled to an upper portion of the sensing assembly 19 thus forming a battery pack 1.

For example, a wiring 23 promoting various electric connections between the upper casing 21 and the sensing assembly 19 is presented in FIG. 1.

Furthermore, in FIGS. 1 and 2, 5S indicates the overlapped battery units.

Figure 4:
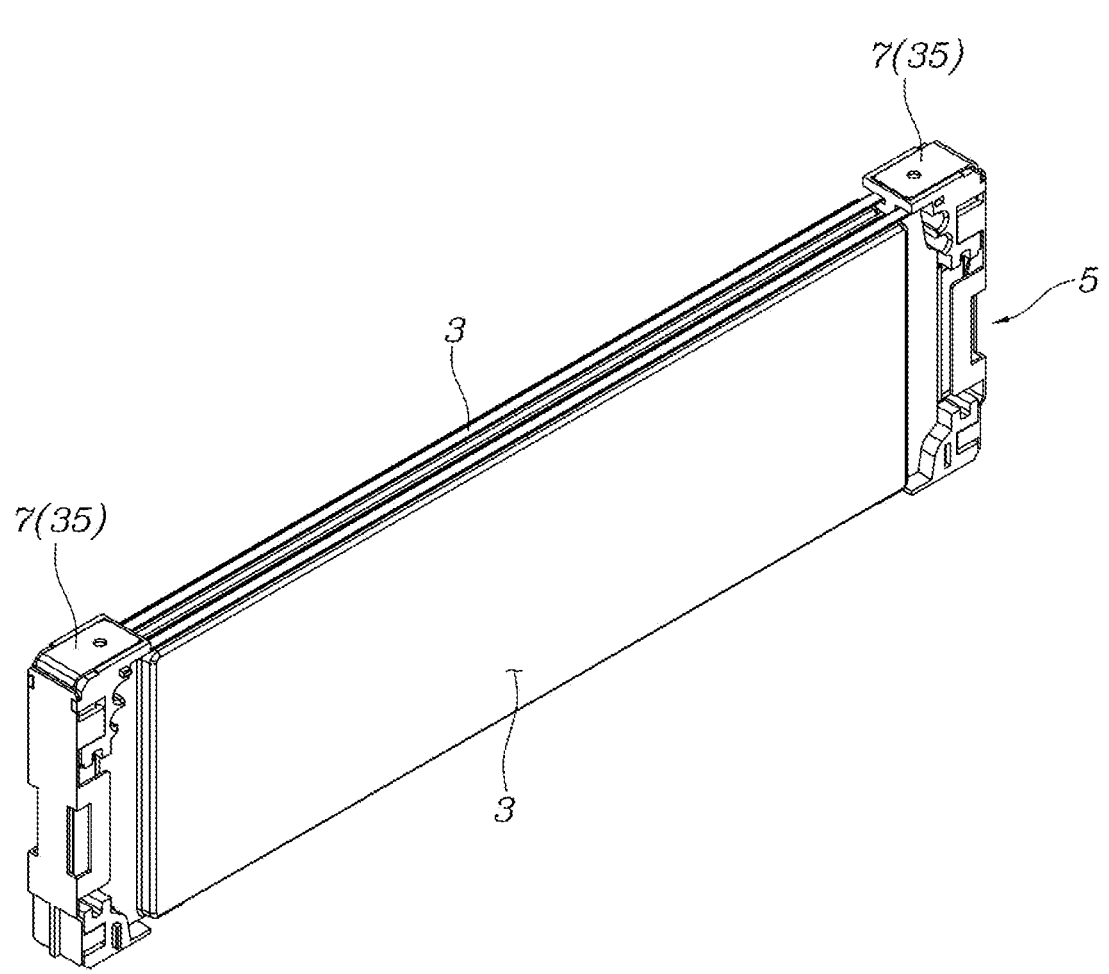
FIG. 4 is a view showing a battery unit.
Figure 5:
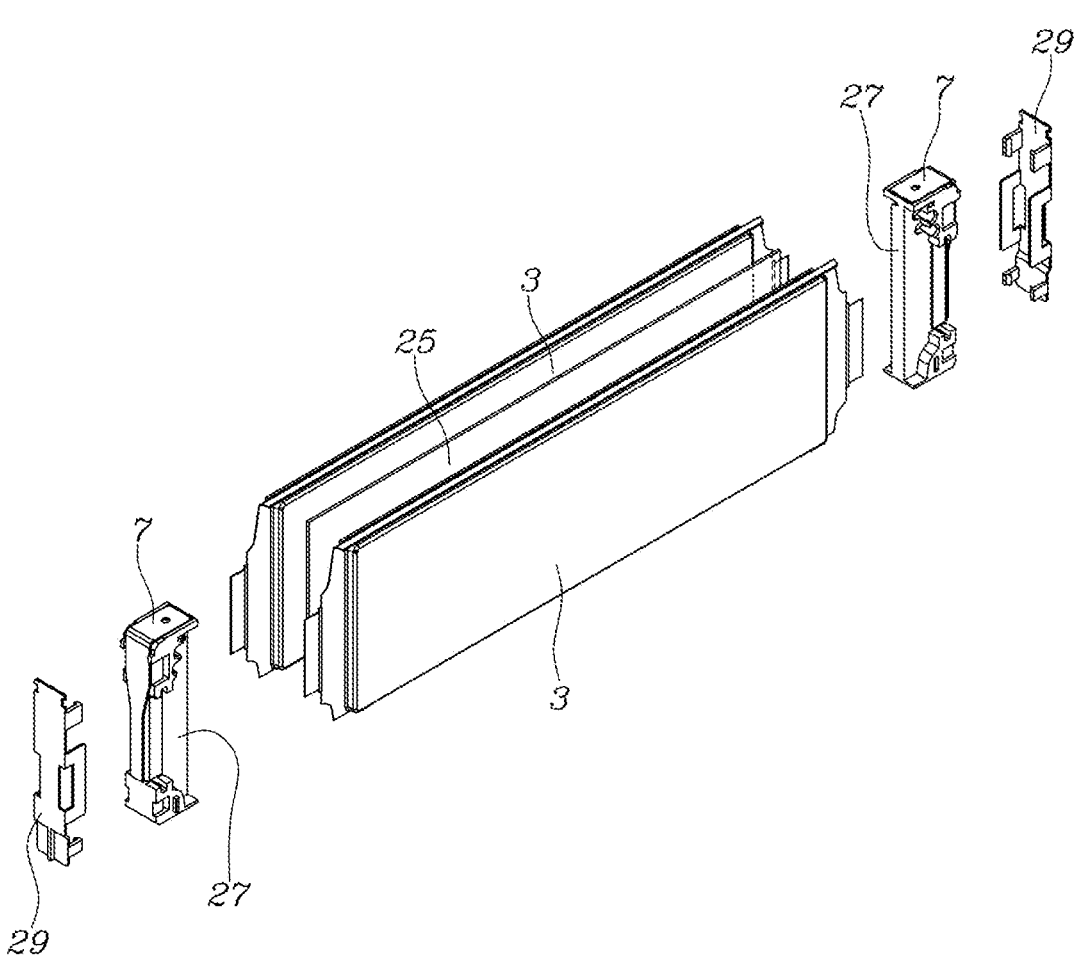
FIG. 5 is an exploded-perspective view showing the battery unit shown in FIG. 4.

As shown in FIGS. 4 and 5, the battery unit 5 may be configured such that two battery cells 3 are overlapped with each other with a compressed pad 25 provided between the two battery cells 3; and the unit busbars 7 are respectively coupled to the electrodes of the two overlapped battery cells 3.

Each of the unit busbar support bodies 9 may include a unit busbar housing 27 and a unit busbar cover 29. The unit busbar housing 27 may support a gap between the battery cells 3 and each of the unit busbars 7, and the unit busbar cover 29 may be coupled to the unit busbar housing 27 with the unit busbar 7 located between the unit busbar cover 29 and the unit busbar housing 27 and may cover an outer portion of the unit busbar 7.

Figure 6:
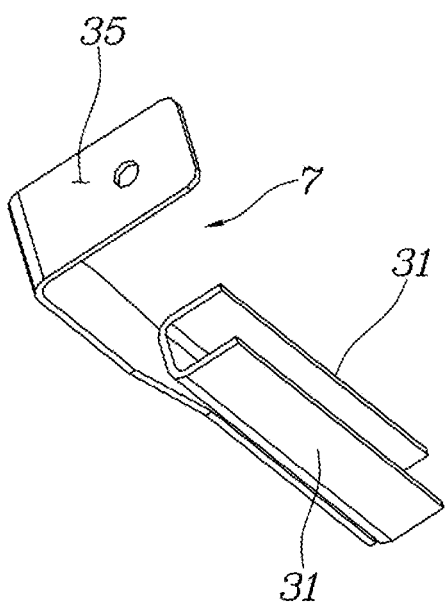
FIG. 6 is a detailed view showing a unit busbar shown in FIGS. 4 and 5.

FIG. 6 is a view showing the unit busbar 7. The unit busbar 7 may include: two electrode coupling portions 31 respectively coupled to the opposite electrodes of the two battery cells 3; and an upper exposed portion 35 extended upward from the battery unit 5 and coupled to inter-busbars 33 of the sensing assembly 19 by welding, the inter-busbars 33 of the sensing assembly 19 will be described later.

The two battery cells 3 of the battery unit 5 may be arranged such that electrodes with same polarity are coupled to the same unit busbar 7, and electrodes with opposite polarities may be arranged in overlapped battery units 5 adjacent to each other. Therefore, when the unit busbars 7 of the two battery units 5 located adjacent to each other may be connected to each other by the inter-busbars 33, the overlapped battery units 5 are connected to each other in series.

Each of the unit busbar support bodies 9 may include a restriction protrusion 37 and a restriction groove 39 to restrain a relative location with respect to another overlapped unit busbar support body 9.

Figure 7:
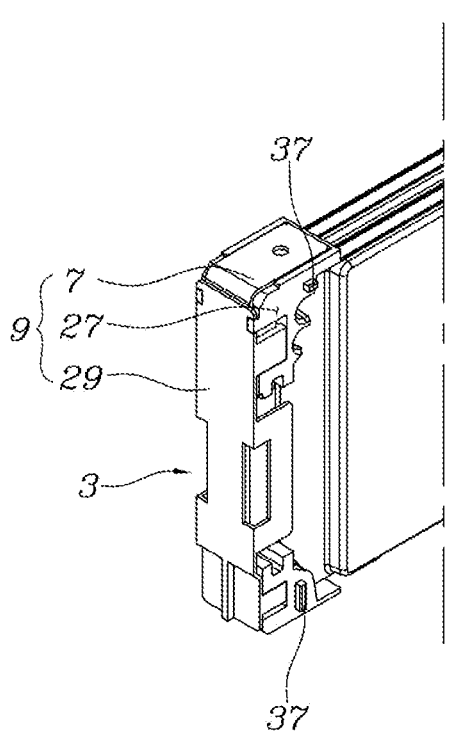
FIG. 7 is a view showing a restriction protrusion and a restriction groove provided in the battery unit.
Figure 7:
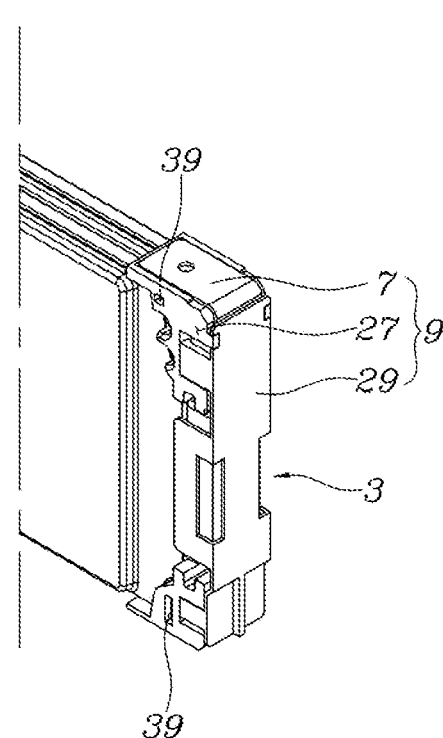

For example, as shown in FIG. 7, the restriction protrusion 37 may protrude on a first surface of the battery unit 5 and the restriction groove 39 is formed on a position corresponding to the restriction protrusion 37 in a second surface of the battery unit 5. Therefore, the two battery units 5 that are overlapped adjacent to each other may be relatively constrained in positional relationship. Consequently, it is possible to stably maintain an overlapped state of the plurality of battery units 5 that are arranged adjacent to each other in order.

The lower tray 11 may include a center member 41 at a center portion thereof and the side walls 13 at side portions thereof. The plurality of battery units 5, au be loaded between the center member 41 and each of the side walls 13 of the lower tray 11 while being overlapped with each other.

In other words, the plurality of battery units 5 in the overlapped state may be loaded on opposite portions of the lower tray 11 based on the center member 41 of the lower tray 11.

The pressing plate 15 may be provided between the overlapped battery units 5 loaded on the lower tray 11 and the side walls 13 of the lower tray 11, and the pressing plate 15 presses the overlapped battery units 5 toward the sensing member. Accordingly, structural stability of the overlapped battery units 5 may be secured and surface pressure of the battery cells 3 constituting the battery units 5 may be secured.

Therefore, compared to a conventional method in which a plurality of battery cells is configured as battery modules by using a separate end plate, etc., and a plurality of battery modules is arranged on the above-described lower tray, the battery pack of embodiments of the present disclosure does not require parts such as the end plate, etc., but additional battery cells may be loaded. Therefore, a larger number of battery cells are loaded on the lower tray substantially the same volume, and the energy density of the battery pack may be ultimately increased.

Figure 8:
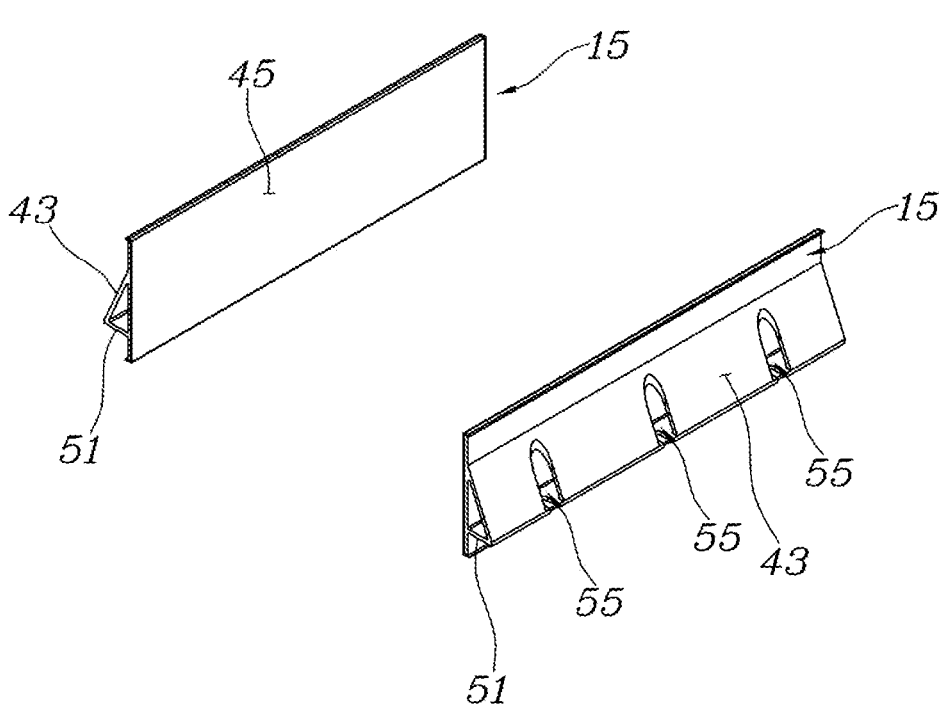
FIG. 8 is a view showing a pressing plate.

As shown in FIG. 8, the pressing plate 15 may include a flat surface facing the battery unit 5 and an inclined surface 43 opposite to the flat surface. The inclined surface 43 may protrude to be gradually inclined in the downward direction.

The pressing plate 15 may be an aluminum extrusion material and may include an insulation film 45 on the surface of the pressing plate 15, the surface facing the battery unit 5.

Figure 9:
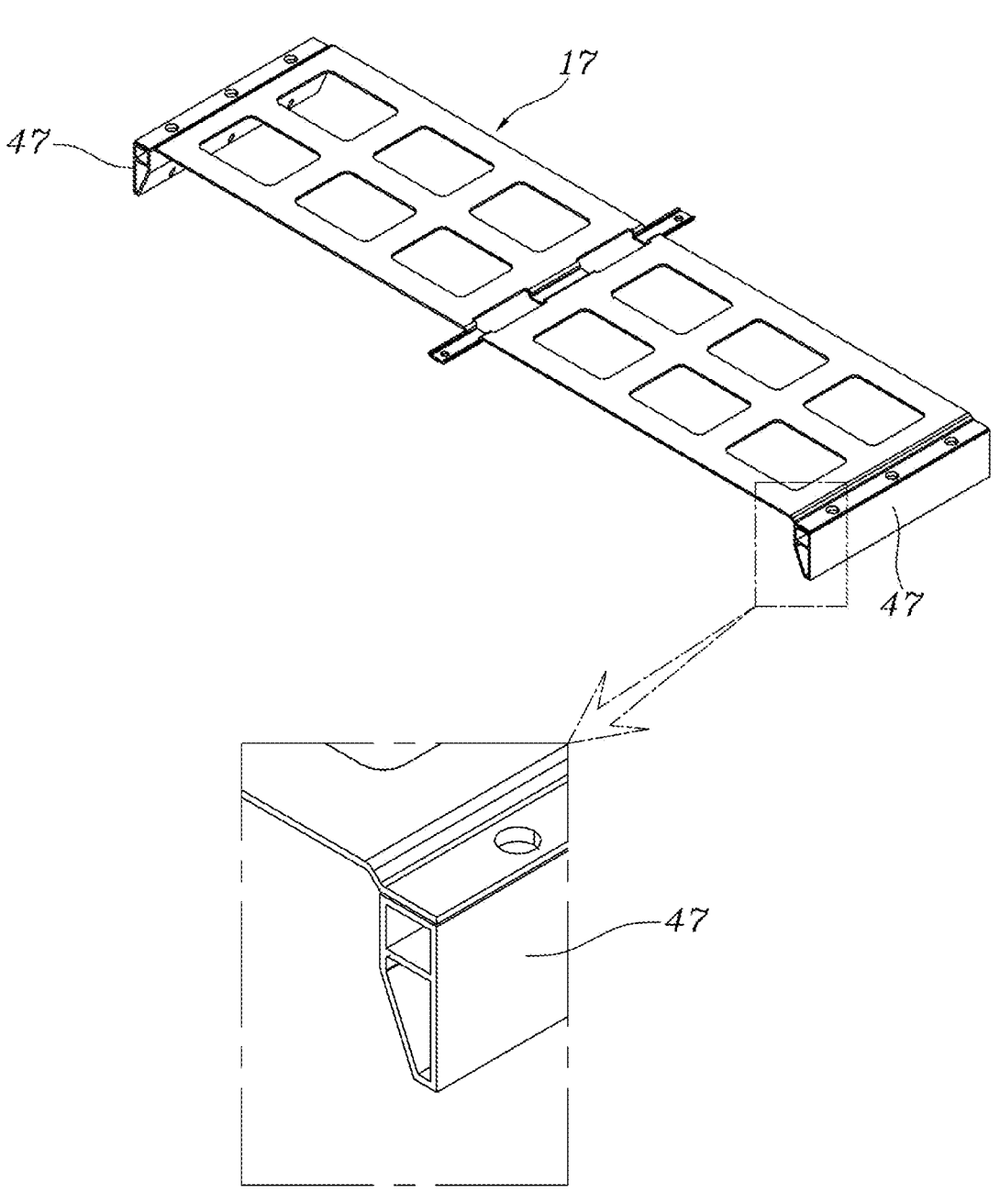
FIG. 9 is a view showing a top cover.

Meanwhile, as shown in FIG. 9, the top cover 17 may include wedge portions 47 integrally formed on lower portions of opposite ends thereof. Each of the wedge portions 47 may press the inclined surface 43 of the pressing plate 15 while being moved downward, so that the pressing plate 15 presses the overlapped battery units 5 toward the center member 41.

Figure 10:
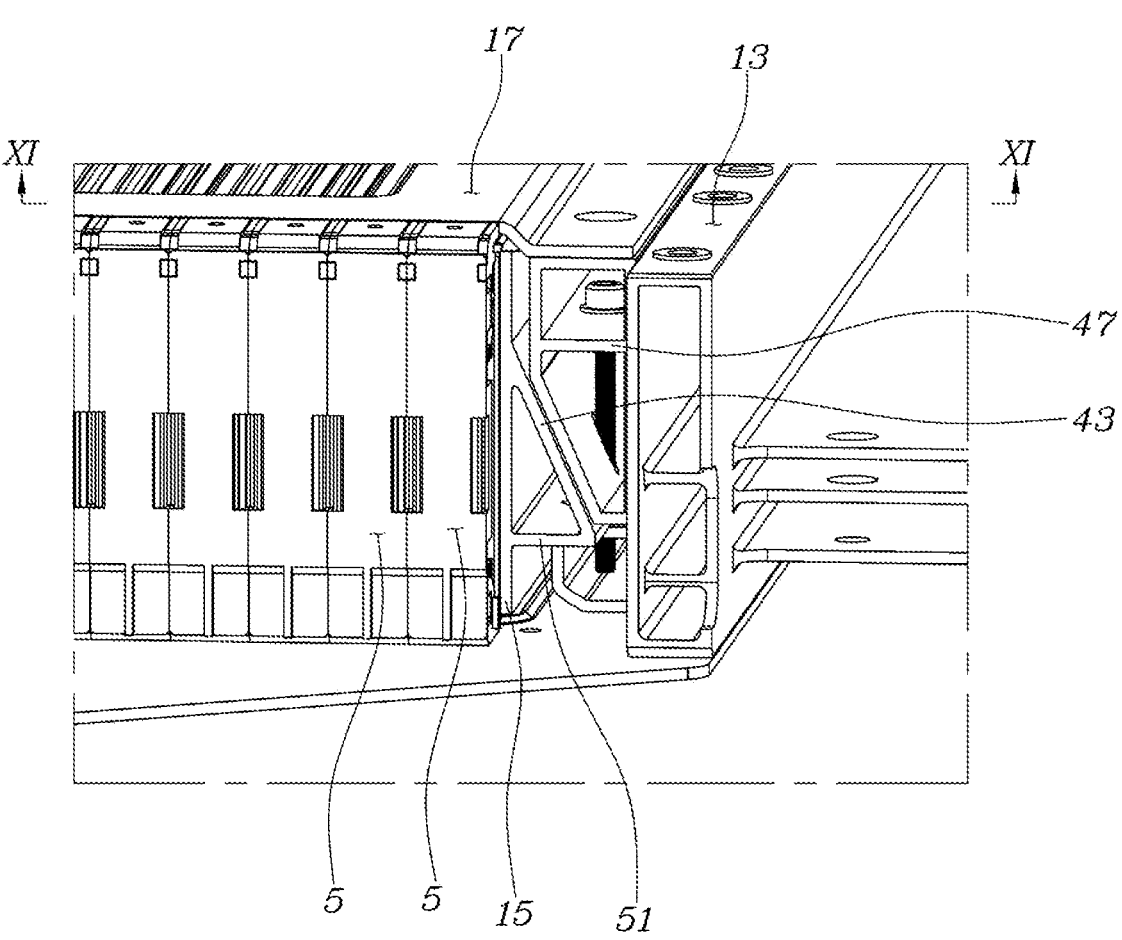
FIG. 10 is a view showing the coupled battery units pressed by the top cover and the pressing plate.
Figure 11:
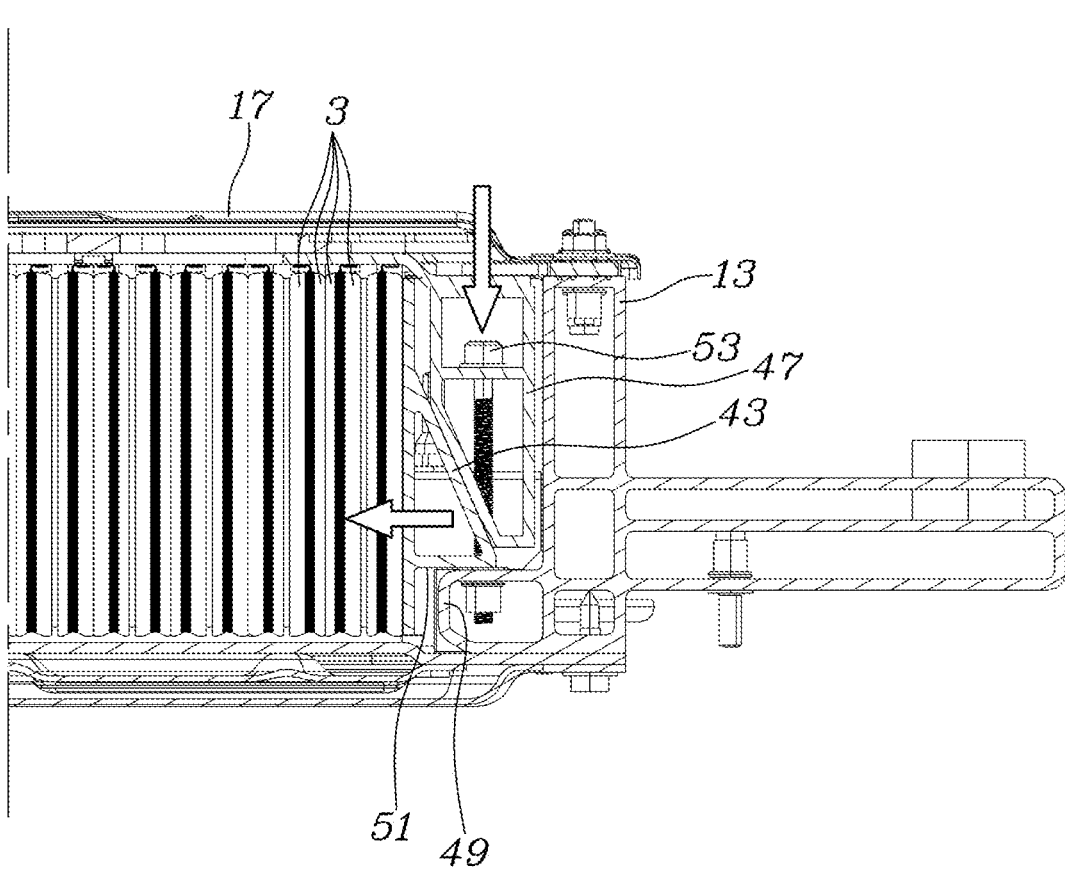
FIG. 11 is a sectional view showing line X I-X I shown in FIG. 10.

In other words, as shown in FIGS. 10 and 11, as each of the wedge portions 47 may be pressed downward between the pressing plate 15 and the side walls 13 of the lower tray 11, thereby generating a pressure for the pressing plate 15 to press the overlapped battery units 5 toward the center member 41.

Referring to FIG. 11, each of the side walls 13 of the lower tray 11 may have an inner protrusion 49 at a lower portion thereof and the inner protrusion protrudes toward the overlapped battery units 5. The pressing plate 15 may include a guide surface 51, and the guide surface 51 may constitute a triangle together with the inclined surface 43 and may be in surface-contact with an upper surface of the inner protrusion 49 so as to guide the pressing plate 15 when the pressing plate 15 is moved toward the battery unit 5.

Furthermore, the battery pack may include a plurality of pressure bolts 53 to press the wedge portions 47 of the top cover 17 toward the inner protrusion 49 of the lower tray 11.

Meanwhile, the inclined surface 43 and the guide surface 51 of the pressing plate 15 may include a plurality of through holes 55 as shown in FIG. 8. The plurality of through holes 55 may be provided to allow movement of the pressing plate 15 while the pressure bolts 53 pass through the pressing plate 15.

Therefore, when the pressure bolts 53 are coupled to the pressing plate, the wedge portion 47 of the top cover 17 is pressed toward the inner protrusion 49 of the lower tray 11. As the wedge portion 47 is moved, the pressing plate 15 may press the battery units 5 toward the center member 41.

The guide surface 51 of the pressing plate 15 may be guided by the upper surface of the inner protrusion 49 of the side walls 13 of the lower tray 11, and the movement of the pressing plate 15 may be freely allowed by the through holes 55 even with the pressure bolts 53.

Figure 12:
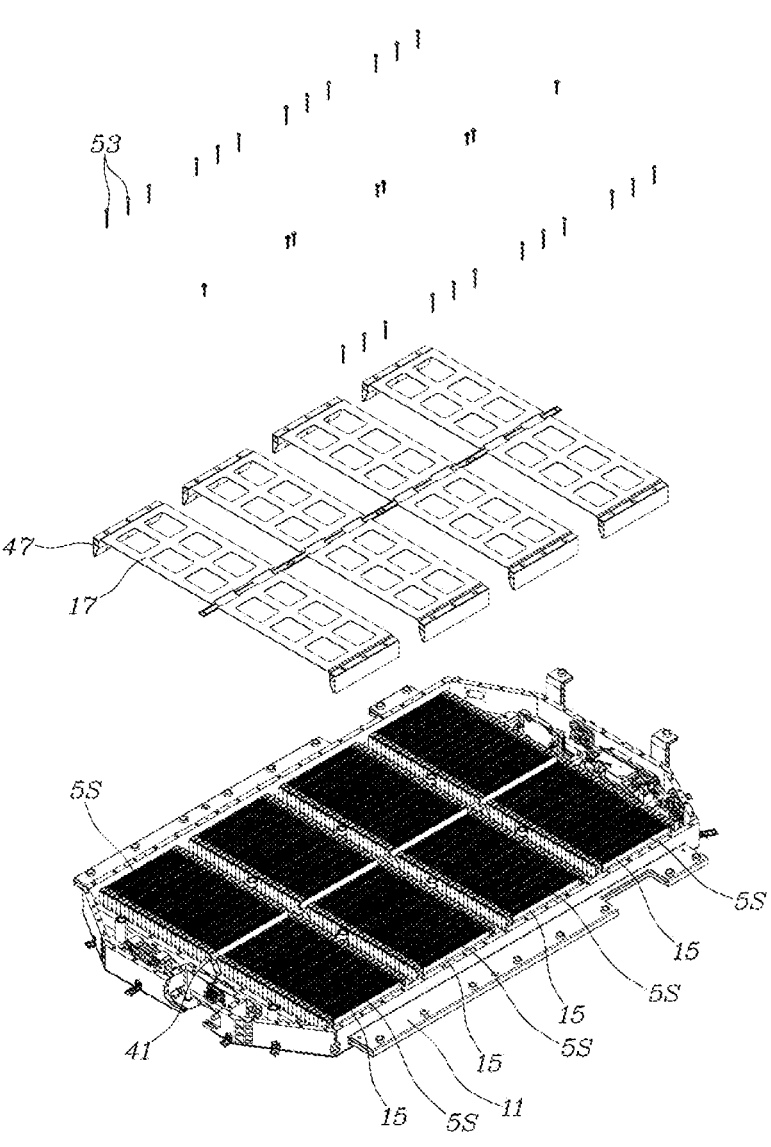
FIG. 12 is a view showing coupling the top cover to a lower tray by a plurality of pressure bolts.

For example, FIG. 12 is a view showing coupling the wedge portions 47 of the top cover 17 to the inner protrusion 49 of the lower tray 11 by the plurality of pressure bolts 53.

Figure 13:
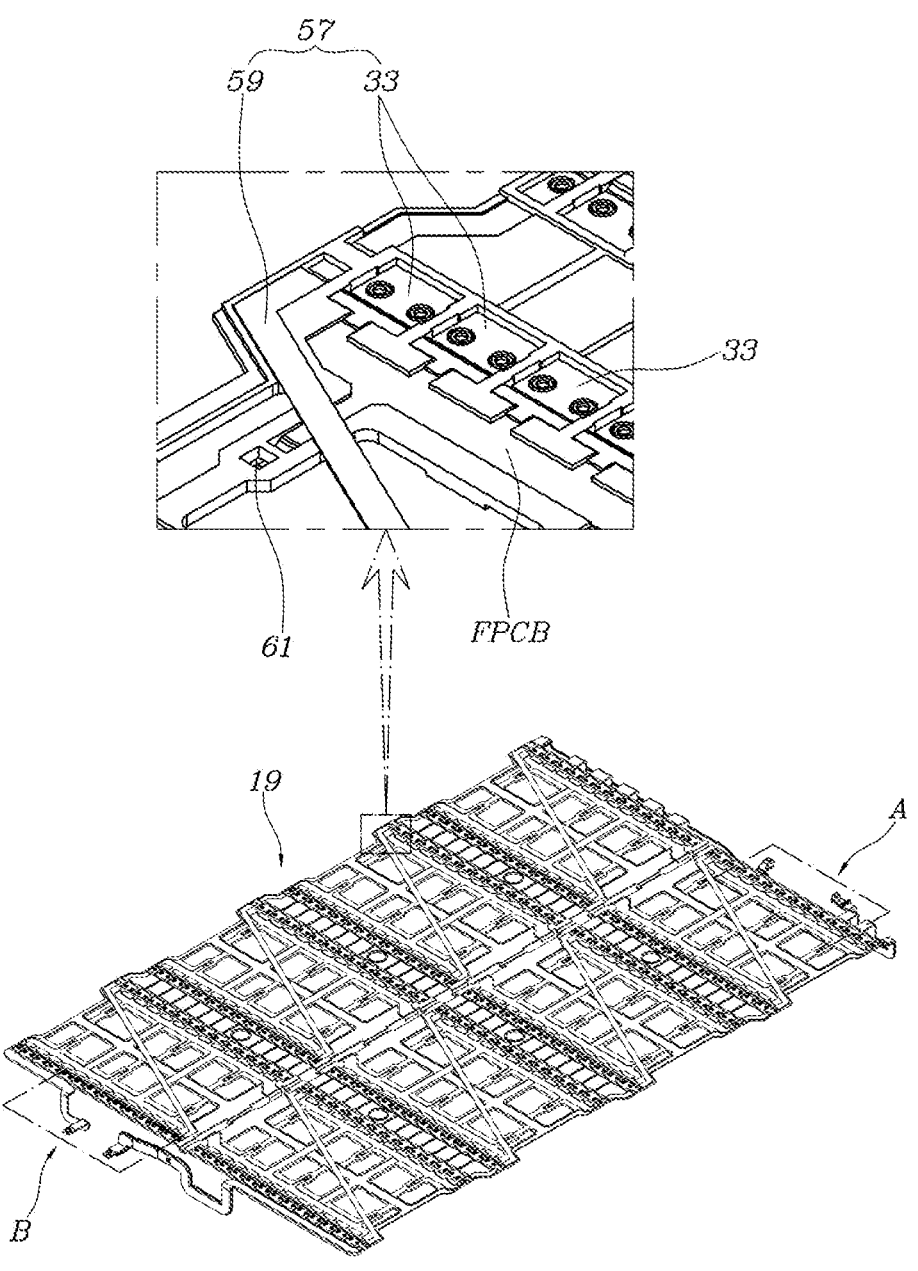
FIG. 13 is a view showing a sensing assembly.

As shown in FIG. 13, the sensing assembly 19 may be formed in a single flat plate integrated with a high current busbar 57 connecting all the battery units 5 loaded on the lower tray 11 to each other in series.

The high current busbar 57 may include the plurality of inter-busbars 33 and a plurality of long busbars 59. The plurality of inter-busbars 33 may be arranged in rows at predetermined intervals in the overlapped direction of the battery units 5 so as to connect the unit busbars 7 of the battery units 5 located adjacent to each other, and the plurality of long busbars 59 may be arranged obliquely across the overlapped battery units 5 so that the rows of the inter-busbars 33 are connected to each other.

The sensing assembly 19 may include a plurality of temperature sensors 61 to measure the temperature of the battery units 5.

Furthermore, the sensing assembly 19 may include a plurality of CMU connectors 63 provided to transmit a voltage of each of the battery cells 3 constituting the battery units 5 and data of the temperature sensors 61 to a cell monitoring unit (CMU).

Figure 14:
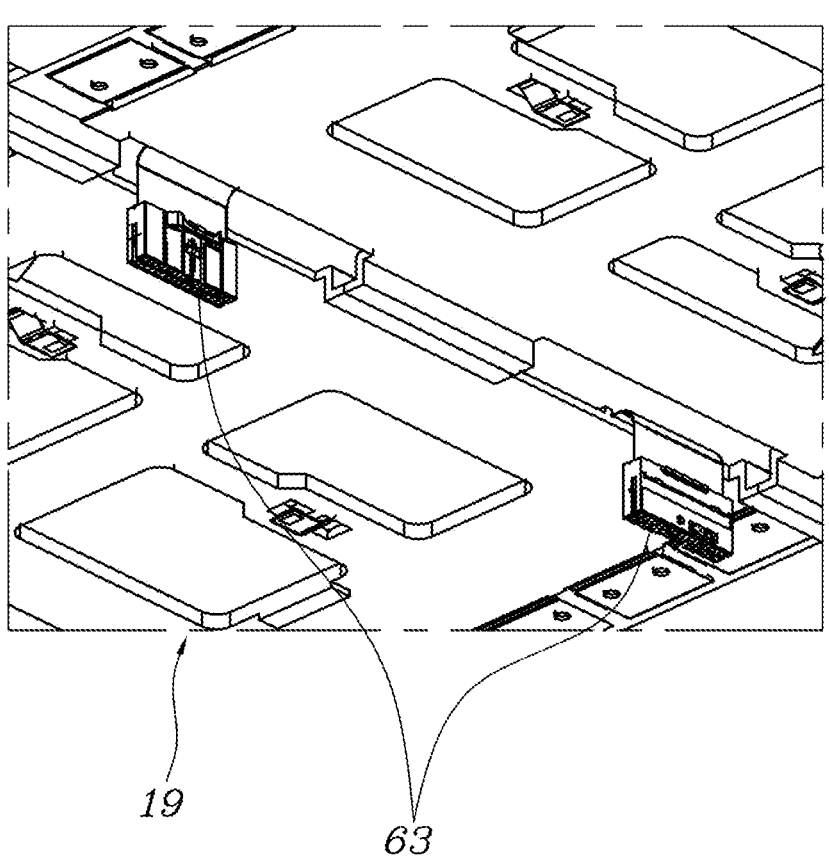
FIG. 14 is a view showing a plurality of CMU connectors located at a lower portion of the sensing assembly shown in FIG. 13.

For example, FIG. 14 is a bottom view showing the sensing assembly 19 shown in FIG. 13, and the plurality of CMU connectors 63 is presented in the drawing.

Furthermore, the sensing assembly 19 may include a flexible printed circuit board (FPCB) integrally provided. The FPCB may be connected to the inter-busbars 33, the temperature sensors 61, and the CMU connectors 63 so as to transmit the voltage and temperature information of each battery unit 5 to the CMU through the CMU connectors 63.

Therefore, as described above, when the sensing assembly 19 is coupled to the upper portion of the plurality of battery units 5 fixed by the top cover 17, series electrical connection between all the battery units 5 loaded on the battery pack 1 may be achieved and also each of the battery units 5 may secure a communication enabled state to the CMU through the FPCB and the CMU connectors 63.

For example, in FIG. 13, a fuse may be connected to location A and a power relay assembly (PRA) may be connected to location B.

The top cover 17 may be formed with the width narrower than the length of each of the battery units 5 so that the unit busbars 7 of the battery units 5 are exposed upward. The high current busbar 57 of the sensing assembly 19 may be weld to upper surfaces of the unit busbars 7 of the battery units 5 exposed through opposite sides of the top cover 17.

Therefore, when the sensing assembly 19 is overlapped above the top cover 17, the inter-busbars 33 of the sensing assembly 19 may be located on the upper surfaces (upper exposed portions) of the unit busbars 7 of the battery units 5, and the sensing assembly 19 and the battery units 5 may be easily coupled to each other by welding.

Although the preferred embodiment of the present disclosure has been disclosed for illustrative purposes, those skilled in the art will appreciate that various modifications, additions, and substitutions are possible, without departing from the spirit and scope of embodiments of the present disclosure.

What is claimed is:

1. A battery pack for a vehicle, the battery pack comprising:

a plurality of battery units each comprising a plurality of battery cells overlapped with each other;

unit busbars respectively coupled to electrodes at opposite ends of the battery cells of each of the battery units, the unit busbars being extended upward from each of the battery units and each having an exposed portion at an upper side of each of the battery units;

a sensing assembly provided above the battery units, the sensing assembly configured to electrically connect the exposed portions;

unit busbar support bodies located at opposite ends of each of the battery units and supporting both the unit busbars and the battery cells;

a lower tray on which the battery units are loaded while being overlapped with each other, the lower tray supporting lower surfaces and side surfaces of the overlapped battery units;

a pressing plate disposed between each of side walls of the lower tray and the battery units, and configured to press the battery units in an overlapped direction of the battery units; and a top cover forcibly coupled to the overlapped battery units in a downward direction so as to cover upper portions of the overlapped battery units, and configured to supply pressure for the pressing plate to press the battery units.

2. The battery pack of claim 1, wherein each of the battery units is configured such that two battery cells are overlapped with each other with a compressed pad provided between the two battery cells; and wherein each of the unit busbars is coupled to the electrodes of the overlapped two battery cells.

3. The battery pack of claim 2, wherein each of the unit busbar support bodies comprises a unit busbar housing and an unit busbar cover, the unit busbar housing supporting a gap between the battery cells and each of the unit busbars and the unit busbar cover being coupled to the unit busbar housing with the unit busbar located between the unit busbar housing and the unit busbar cover and covering an outer portion of the unit busbar.

4. The battery pack of claim 2, wherein each of the unit busbar support bodies has a restriction protrusion and a restriction groove at positions corresponding to each other so as to restrain a relative location in response to another unit busbar support body overlapped with each other.

5. The battery pack of claim 1, wherein the lower tray comprises a center member at a center portion thereof and the side walls at side portions thereof; and wherein a plurality of battery units is arranged to be overlapped with each other between the center member and each of the side walls.

6. The battery pack of claim 5, wherein the pressing plate has a flat surface facing the battery units and an inclined surface opposite to the flat surface, the inclined surface protruding to be gradually inclined outward in the downward direction.

7. The battery pack of claim 6, wherein the top cover comprises wedge portions integrally formed on lower portions of opposite ends, the wedge portions being configured to press the inclined surface of the pressing plate while being moved downward, so that the pressing plate presses the overlapped battery units toward the center member.

8. The battery pack of claim 7, wherein each of the side walls of the lower tray has an inner protrusion at a lower portion thereof, the inner protrusion protruding toward the overlapped battery units; and wherein the pressing plate has a guide surface, the guide surface constituting a triangle together with the inclined surface and being in surface-contact with an upper surface of the inner protrusion and being configured to guide the pressing plate when the pressing plate is moved toward the battery units.

9. The battery pack of claim 8, further comprising:

a plurality of pressure bolts configured to press each of the wedge portions of the top cover toward the inner protrusion of the lower tray, wherein the inclined surface and the guide surface of the pressing plate respectively have a plurality of through holes, and the plurality of through holes allows the pressing plate to be moved while the plurality of pressure bolts pass through the pressing plate.

10. The battery pack of claim 1, wherein:

the sensing assembly is provided above the top cover, and wherein the sensing assembly is formed in a single flat plate integrated with a high current busbar connecting all the battery units loaded on the lower tray to each other in series.

11. The battery pack of claim 10, wherein the high current busbar comprises:

a plurality of inter-busbars arranged in rows at predetermined intervals in an overlapped direction of the battery units so as to connect the unit busbars of the battery units located adjacent to each other; and a plurality of long busbars arranged obliquely across the overlapped battery units so that the rows of the inter-busbars are connected to each other.

12. The battery pack of claim 11, wherein the sensing assembly comprises a plurality of temperature sensors measuring temperatures of the battery units.

13. The battery pack of claim 12, wherein the sensing assembly comprises a plurality of center monitor unit (CMU) connectors configured to transmit a voltage of each of the battery cells constituting each of the battery units and data of the temperature sensors to a CMU.

14. The battery pack of claim 13, wherein the sensing assembly comprises a FPCB integrally provided, the FPCB is connected to the plurality of inter-busbars, the plurality of temperature sensors, and the plurality of CMU connectors so as to transmit the voltage and temperature information of each of the battery units through the CMU connectors.

15. The battery pack of claim 10, wherein the top cover is formed with a width narrower than a length of each of the battery units so that the unit busbars of each of the battery units are exposed upward; and wherein the high current busbar of the sensing assembly is weld to the upper surfaces of the unit busbars of the battery units exposed through opposite sides of the top cover.

16. A vehicle comprising the battery pack of claim 1.

* * * * *